(12) United States Patent
Cohen (10) Patent No.: US 6,606,259 B2
(45) Date of Patent: Aug. 12, 2003

(54) CLAMPED-INDUCTANCE POWER CONVERTER APPARATUS WITH TRANSIENT CURRENT LIMITING CAPABILITY AND OPERATING METHODS THEREFOR

(75) Inventor: Isaac Cohen, Dix Hills, NY (US)

(73) Assignee: Lambda Electonics, Inc., Melville, NY (US)

( * ) Notice: Subject to any disclaimer, the term of this patent is extended or adjusted under 35 U.S.C. 154(b) by 42 days.

(21) Appl. No.: 09/935,999

(22) Filed: Aug. 23, 2001

(65) Prior Publication Data

US 2003/0039128 A1 Feb. 27, 2003

(51) Int. Cl.$^7$ ............................................... H02H 7/122
(52) U.S. Cl. ............................ 363/56.01; 363/56.12; 323/247; 323/908
(58) Field of Search .......................... 363/56.01, 56.07, 363/56.08, 56.1, 56.11, 56.12; 323/247, 908; 361/58, 91.7, 93.1, 93.9; 315/291

(56) References Cited

U.S. PATENT DOCUMENTS

| | | | |
|---|---|---|---|
| 4,441,146 A | 4/1984 | Vinciarelli | |
| 4,959,764 A | 9/1990 | Bassett | |
| 5,291,382 A | 3/1994 | Cohen | |
| 6,304,041 B1 * | 10/2001 | Farkas et al. | 315/291 |

OTHER PUBLICATIONS

Korotkov et al., "Small–Signal Modeling of Soft–Switched Asymmetrical Half–Bridge DC/DC Converter," 1995, pp. 707–711 (no month).

"Data Sheet TEA1504 GreenChip™SMPS control IC," Preliminary specification, Philips Semiconductors, Dec. 7, 1999, 20 pages.

"Application Note 4105, Design Considerations for Switched Mode Power Supplies Using a Fairchild Power Switch (SPS) in a Flyback Converter," Fairchild Semiconductor™, 2001, 22 pages (no month).

"Control Circuit for SMPS," Philips Semiconductors Integrated Circuit Catalog, TDA1060;A;B;T, Feb. 1986, pp. 1023–1037.

Oruganti et al., "Soft–Switched DC/DC Converter with PWM Control," INTELEC 93, Palais Des Congres, Paris, France, Sep. 27–30, 1993, pp. 341–349.

* cited by examiner

Primary Examiner—Jessica Han
(74) Attorney, Agent, or Firm—Myers Bigel Sibley & Sajovec (57) ABSTRACT

A power converter apparatus, such as a DC—DC converter, includes a switch that controls current transfer between an input port and an inductance. A control circuit is operative, while current is being transferred between the inductance and a clamping circuit, to control the switch responsive to a current in the inductance. For example, the control circuit may include a current sensor configured to be coupled in series with the inductance and a switch control circuit operative to control the first switch responsive to a current sense signal generated by the current sensor. The switch control circuit may be operative to prevent transition of the switch from the first state to the second state until the current sense signal meets a predetermined criterion, e.g., a signal state indicative of a desired current condition, such as a current approximating zero or a current reversal. Related operating methods are also discussed.

37 Claims, 9 Drawing Sheets

CLAMPED-INDUCTANCE POWER CONVERTER APPARATUS WITH TRANSIENT CURRENT LIMITING CAPABILITY AND OPERATING METHODS THEREFOR

BACKGROUND OF THE INVENTION

The present invention relates to power converter apparatus and methods, and more particularly, to clamped converters, asymmetrical half-bridges, and similar power conversion apparatus that use a clamped inductance.

DC—DC converters and other power conversion apparatus often use "clamped converter" and "asymmetrical half-bridge" configurations. A common feature of such devices is the use of a power conversion cycle in which a transformer winding, inductor or other inductance is energized in an "on" phase by application of an input voltage (directly or via magnetic coupling) and then "clamped" during an "off" phase using a capacitor and/or other circuitry that receives magnetizing energy from the inductance. Examples of such converter configurations may be found in U.S. Pat. No. 4,441,146 to Vinciarelli; U.S. Pat. No. 4,959,764 to Bassett; U.S. Pat. No. 5,291,382 to Cohen; "Small-Signal Modeling of Soft-Switched Asymmetric Half-Bridge DC/DC Converter," by Korotkov et al, IEEE Applied Power Electronics Conference, Record, 1995, p. 707–711.

Many conventional clamped converter and asymmetrical half-bridge designs use a capacitor to receive energy during the "off" phase. A potential drawback of such circuits is that an abrupt change in the converter's duty cycle can lead to an incomplete energy transfer during the "off" phase due to premature entry into the "on" phase. This can lead to undesirably large peak currents in the inductance. For example, in a transformer-type clamped converter, an abrupt change in duty cycle may lead to excessive magnetizing current in the transformer, which can, in turn, lead to saturation of the transformer. In circuits that use a transistor with an integral body diode to switch the clamping circuit, such premature entry into the "on" phase can also damage the transistor through uncontrolled reverse recovery of the body diode.

SUMMARY OF THE INVENTION

In some embodiments of the invention, a power converter apparatus, such as a DC—DC converter, power supply, or the like, includes an input port, an output port, an inductance, a clamping circuit coupled to the inductance and an output circuit coupled to the inductor and the output port. The inductance may include, for example, a transformer winding and/or a discrete inductor. The apparatus also includes a switch operative to control energy transfer between the input port and the inductance. The apparatus further includes a control circuit operative to control the switch responsive to a current in the inductance while current is being transferred between the inductance and the clamping circuit. For example, the control circuit may include a current sensor configured to be coupled in series with the inductance while current is being transferred between the inductance and the clamping circuit and operative to generate a current sense signal indicative of the current in the inductance, along with a switch control circuit operative to control the first switch responsive to the current sense signal. The switch control circuit may be operative to prevent transition of the switch from the first state to the second state until the current sense signal meets a predetermined criterion, e.g., a signal state indicative of a desired current condition, such as a current approximating zero or a current reversal.

In further embodiments of the invention, the switch includes a first switch. The clamping circuit includes an impedance, such as a capacitor, a second switch operative to control current flow between the impedance and the inductance, and a clamping control circuit operative to control the second switch. The second switch may include a transistor that is responsive to a clamping control signal, and a diode, such as a transistor body diode, coupled in parallel with the transistor. A current limiting circuit may be provided to limit current in the second switch. In some embodiments, the current limiting circuit may be asymmetrical, i.e., may provide a variable impedance responsive to the direction of the current between the impedance and the inductance.

In other embodiments of the invention, a power converter apparatus includes an input port, an output port, and an inductance. A first switch is coupled to the input port and the inductance and controls current flow between the input port and the inductance. A second switch is coupled to an impedance and the inductance, and controls current flow between the impedance and the inductance. A control circuit operates the first and second switches in a substantially complementary fashion to provide energy transfer between the inductance and respective ones of the input port and the impedance, and is further operative to control operation of the first switch responsive to a current in the inductance. An output circuit couples the inductance to the output port.

In method embodiments of the invention, a power converter apparatus that transfers energy from a power source to a load by cyclically energizing an inductance is operated. The power source is decoupled from the inductance. The inductance is then clamped while sensing a current therein. The power source is then coupled to the inductance responsive to the sensed current.

Embodiments of the invention may provide significant advantages over convention converter configurations. In particular, by controlling coupling of a clamped inductance to a power source responsive to current in the inductance while it is being clamped, e.g., responsive to a sensed current in the clamping circuit, the present invention may limit peak current generated in the inductance during transient conditions when the charging/clamping cycle of the inductance abruptly changes and, thus, may prevent saturation of the inductance. In some converter configurations, the invention may also reduce damaging effects, such as uncontrolled reverse recovery of switching diodes.

DETAILED DESCRIPTION

Specific embodiments of the invention now will be described more fully with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
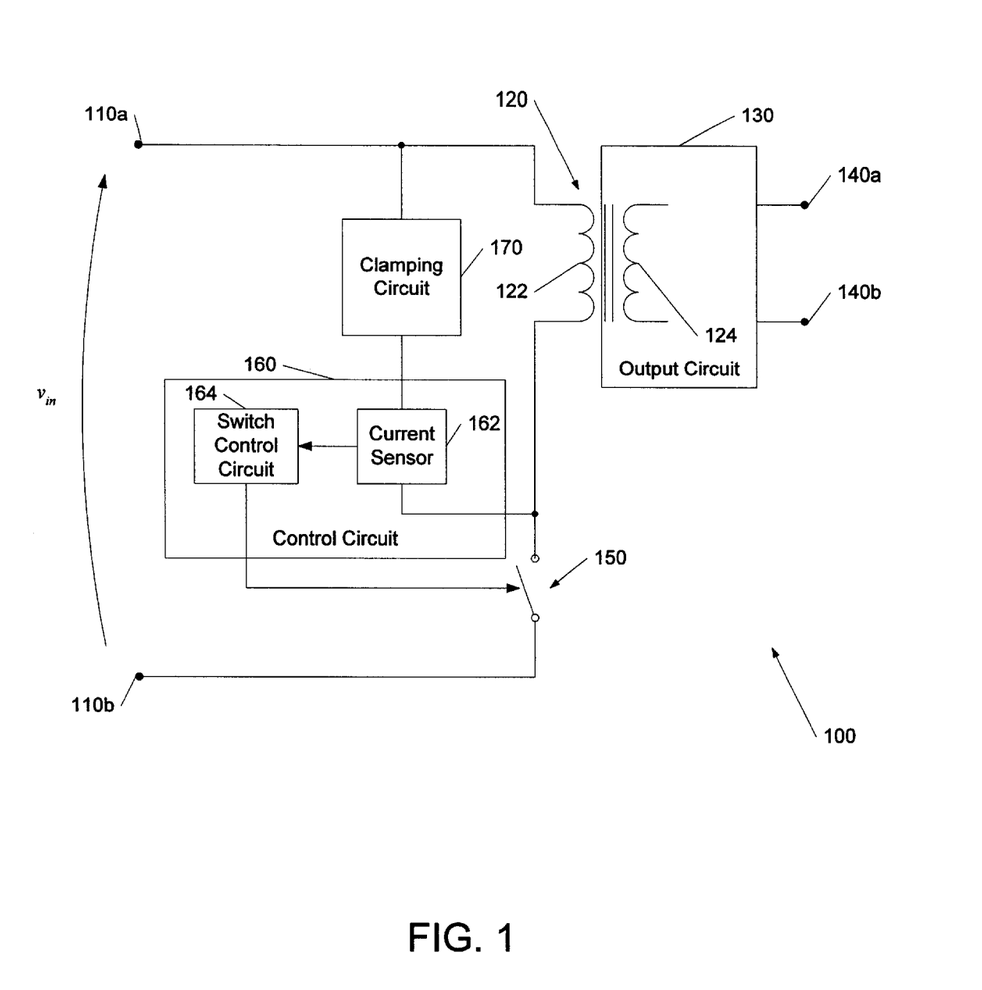
FIG. 1 is a schematic diagram of a clamped converter apparatus according to embodiments of the invention.

FIG. 1 illustrates a power converter apparatus 100 according to embodiments of the invention. The apparatus 100 includes an input port 110a, 110b at which a voltage $v_{in}$, for example, a DC voltage produced by a rectifier, may be applied. The apparatus 100 also includes an output port 140a, 140b, an inductance in the form of a primary winding 122 of a transformer 122, a clamping circuit 170 and an output circuit 130, here shown as including a secondary winding 124 of the transformer 120, coupled to the inductance 122 and the output port 140a, 140b. The apparatus further includes a switch 150 that is operative to couple and decouple the input port 110a, 110b and the inductance 122 to selectively apply the input voltage $v_{in}$ thereto. The apparatus 100 further includes a control circuit 160, here shown as including a current sensor 162 coupled in series with the clamping circuit 170 and a switch control circuit 164 that is responsive to the current sensor 162. The control circuit 160 is operative to sense a current in the inductance 122 while the clamping circuit 170 receives current from the inductance 122. The control circuit 160 is further operative to control the switch 150 responsive to the current in the inductance 122.

It will be understood that, in a particular application, the converter apparatus 100 will typically include other components. In particular, the control circuit 160 and/or the clamping circuit 170 may be further controlled responsive to, for example, a voltage and/or current at the output port 140a, 140b, or to another circuit state, such as a voltage and/or current of additional circuitry coupled to the apparatus. For purposes of the generality of description, detailed discussion of such voltage and/or current feedback control techniques will not be provided herein.

It also will be appreciated that the configuration of FIG. 1 may be modified within the scope of the invention. For example, rather than using a current sensor 162 coupled in series with a clamping circuit 170 as shown in FIG. 1, other current sensing techniques can be used with the invention, including, for example, a current sensor coupled in series with the inductance 122.

It will also be understood that the invention is not limited to the "clamped converter" configuration shown in FIG. 1. In general, the invention is also applicable to a variety of power converter configurations, including configurations that use types of inductances other than transformer windings. The invention is also generally applicable to configurations using a variety of different types of clamping circuits, including, but not limited to, resonant (e.g., capacitive) clamping circuits, dissipative (e.g., resistive) clamping circuits, and combinations thereof. Moreover, the invention may be embodied in a variety of different types of devices, such as DC—DC converters, power supply devices, uninterruptible power supply (UPS) devices, and the like. The invention generally may be implemented using discrete electrical components, integrated circuits, and combinations thereof.

Figure 2:
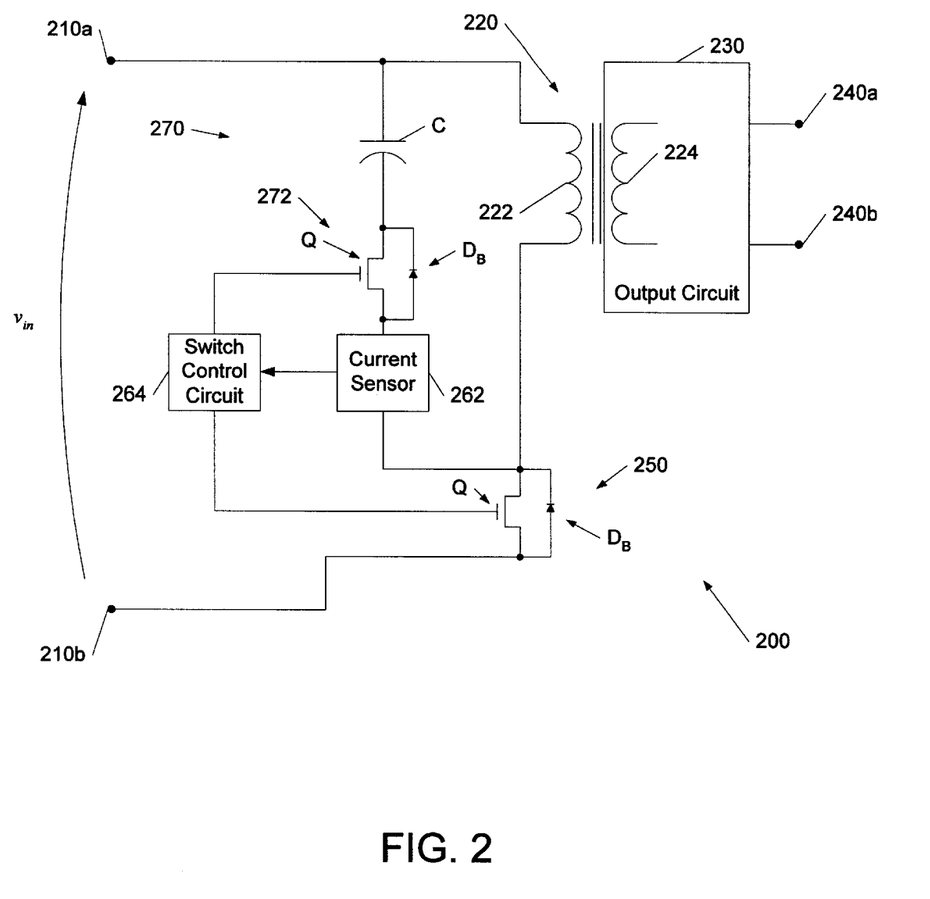
FIG. 2 is a schematic diagram of a clamped converter apparatus according to other embodiments of the invention.

FIG. 2 illustrates a power converter apparatus 200 according to other embodiments of the invention. The apparatus 200 includes an input port 210a, 210b, an output port 240a, 240b, an inductance in the form of a primary winding 222 of a transformer 220, and an output circuit 230, here shown as including a secondary winding 224 of the transformer 220, coupled to the inductance 222 and the output port 240a, 240b. A switch 250, here shown as including a transistor Q and associated body diode DB, is operative to couple and decouple the input port 210a, 210b and the inductance 222 to selectively apply an input voltage $v_{in}$ thereto. A clamping circuit 270 includes a capacitor C and second switch 272, here shown as including a transistor Q and a body diode $D_B$, that is operative to control current flow between the capacitor C and the inductance 222.

A current sensor 262 is coupled in series with the switch 272 and is operative to sense a current in the inductance 222 while the switch 272 couples the clamping capacitor C across the inductance 222. A switch control circuit 264 generates respective control signals that are applied to respective ones of the switches 250, 272. In particular, the switch control circuit 264 is operative to control the switch 250 responsive to a current sense signal 263 generated by the current sensor 262.

Figure 3:
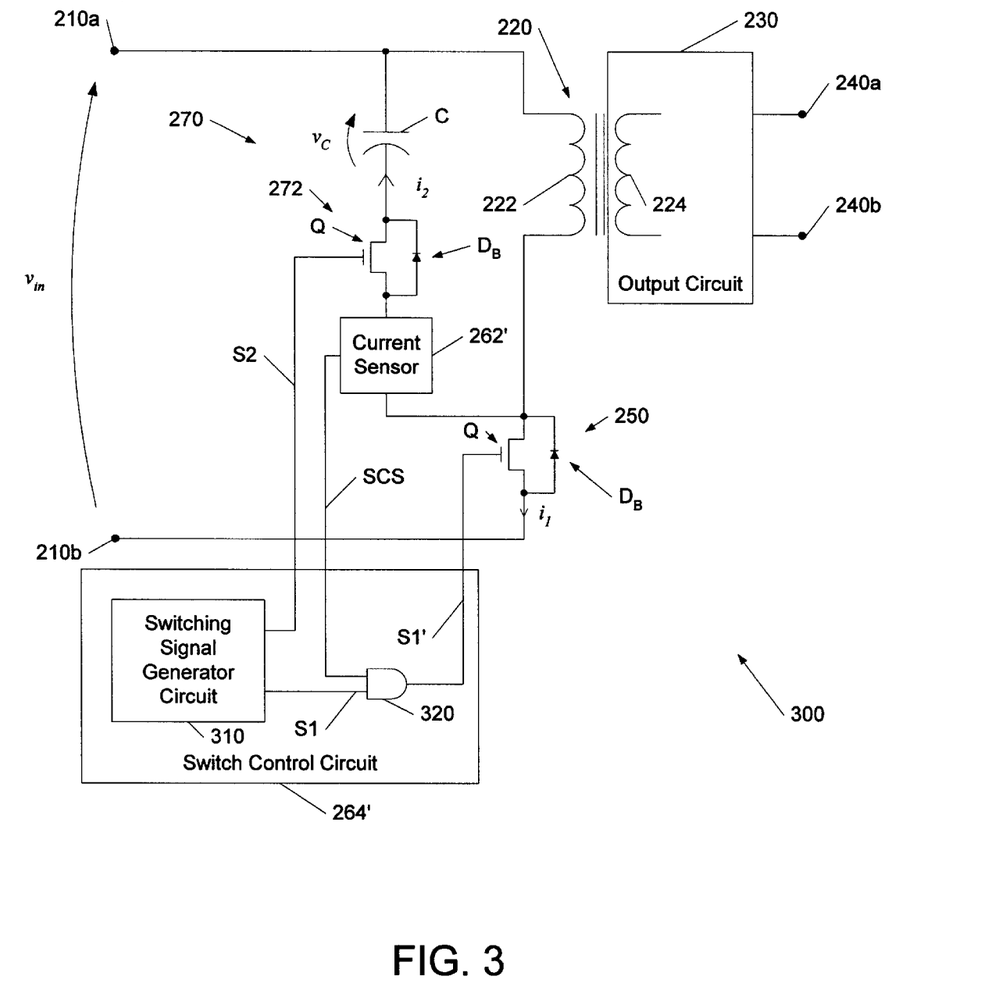
FIG. 3 is a schematic diagram illustrating a clamped converter apparatus with an exemplary control circuit configuration according to some embodiments of the invention.

As illustrated in FIG. 3, a power converter apparatus 300 according to other embodiments of the present invention is similar to the apparatus 200 of FIG. 2, with like components being indicated by like reference numerals, description of which is provided in the foregoing discussion of FIG. 2. The apparatus 300 includes a switch control circuit 264' including a switching signal generator circuit 310 that generates first and second switch control signals S1, S2. The switch control signal S1 is applied to an AND gate circuit 320, which also receives a current sense signal SCS generated by a current sensor 262' coupled in series with a clamping circuit 270. The AND gate 320 generates a control signal S1' that is applied to the switch 250, which controls current flow between the inductance 222 and the input port 210a, 210b responsively thereto.

Figure 4A:
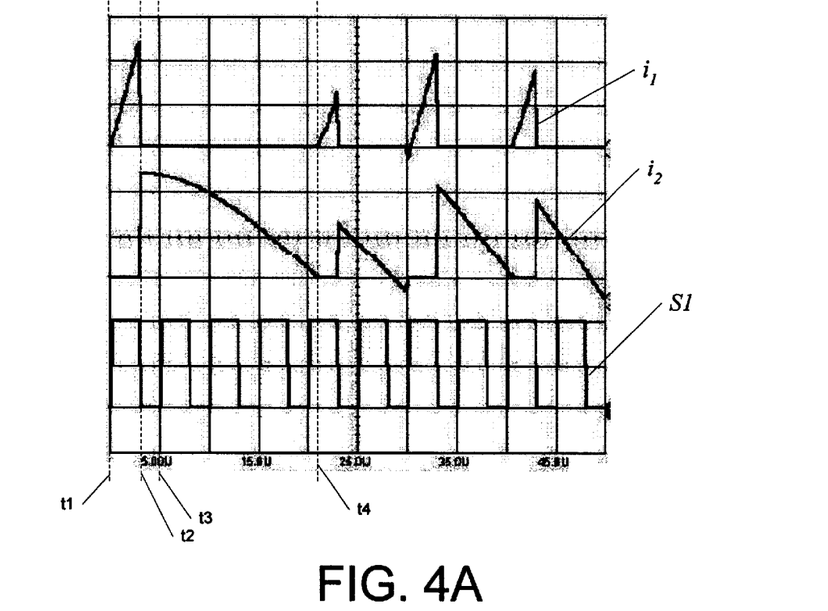
FIGS. 4A and 4B are waveform diagrams illustrating exemplary operations of the converter apparatus of FIG. 3 according to embodiments of the invention.
Figure 4B:
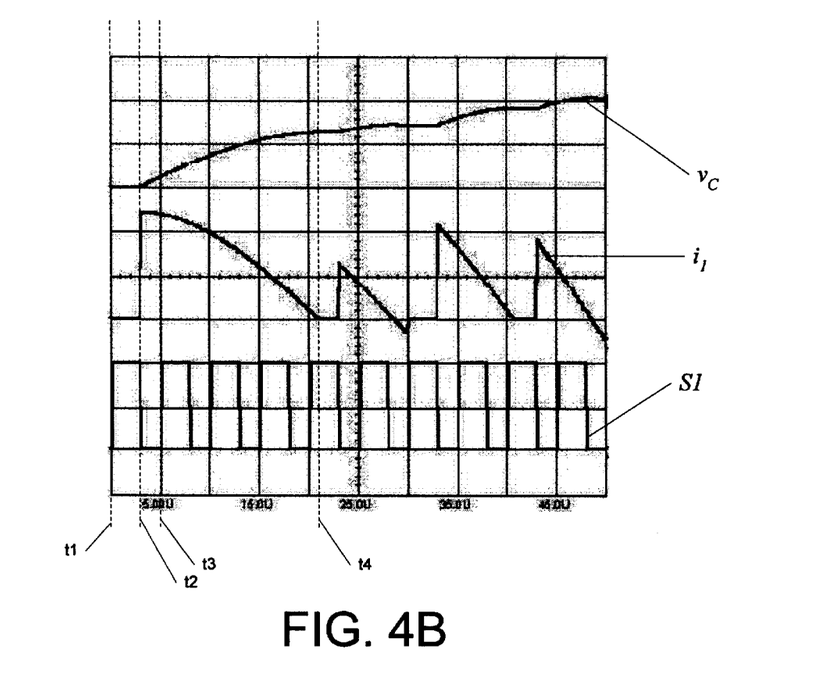

Exemplary operations of the apparatus 300 may be understood by reference to FIGS. 4A and 4B. In the embodiments illustrated in FIGS. 3, 4A and 4B, the first and second drive signals S1, S2 transition in a substantially complementary fashion, i.e., in a complementary fashion that may incorporate a small amount of "dead time" such that signal S1 delays transition to a "high" state for a short period after transition of the signal S2 to a "low" state, and/or vice versa. Generation of the control signals S1, S2 may be achieved via any of a number of conventional control techniques commonly used in clamped converter apparatus, for example, using voltage and/or current feedback techniques.

Prior to a time t1, it is assumed that the first and second signals S1, S2 transition at substantially constant complementary duty cycles such that the first signal S1 has a duty cycle approaching 0% and such that the second signal S2 has a duty cycle approaching 100%, i.e., such that the second signal S2 is at nearly a continuous "high" state while the first signal is at nearly a continuous "low" state. As a result, the switch 272 of the clamping circuit 272 is "on" substantially more than the switch 250. Accordingly, the current $i_1$ in the inductance 222 remains relatively low and, consequently, the voltage $v_C$ across the clamping capacitor C remains relatively low. Such a condition might occur, for example, when the apparatus 300 is lightly loaded at the output port 240a, 240b.

At time t1, however, the duty cycles of the signals S1, S2 abruptly change such that the duty cycle of the signal S1 abruptly increases to around near 50% and the duty cycle of the switch S2 abruptly decreases to around 50%. Such a change might occur, for example, in response to an increase in load at the output port 240a, 240b. In a first "on" interval of the switch 250 from time t1 to time t2, the current $i_1$ ramps up to a relatively high level, such that, when the switch 250 is turned off at time t2 and the switch 272 turns "on" by forward biasing of the body diode $D_B$ shortly thereafter, a relatively large current $i_2$ begins to flow from the inductance 222 to the capacitor C. Because the decay time for this large initial current is relatively long due to the highly discharged state of the capacitor at time t2, the current $i_2$ remains relatively high when the signal S1 goes "high" again at time t3. However, the current sense signal SCS remains "low" due to the positive, nonzero level of the current $i_2$, maintaining the switch 250 in an "off" state until the current $i_2$ falls to near zero at time t4, several cycles of the signals S1, S2 later. For the operations illustrated in FIGS. 4A and 4B, this current limiting action continues for subsequent cycles of the signals S1, S2. However, assuming that the duty cycles of the signals S1, S2 remain relatively constant, the converter may approach a steady state, wherein the current $i_2$ reaches zero before each new rising edge of the signal S1 and the voltage $v_C$ remains relatively constant. The action of the current sense signal SCS serves to limit the peak value of the current generated in the inductance 222 during the transient period following the abrupt change in the substantially complementary duty cycles of the signals S1, S2 at time t1. This can prevent saturation of the transformer 220. The action of the current sense signal SCS can also provide a more controlled reverse recovery of the body diode $D_B$ of the switch 272.

It will be understood that apparatus and operations described with reference to FIGS. 3 and 4A–4B may be modified within the scope of the invention. For example, rather than configure the current sensor 262' to transition the current sense signal SCS when the current $i_2$ is approximately zero, the current sensor 262' could be configured to transition the current sense signal SCS at some other current level, such as a positive level that can still provide saturation protection, or a negative level that can provide better reverse recovery for the body diode $D_B$ of the switch 272.

Figure 5:
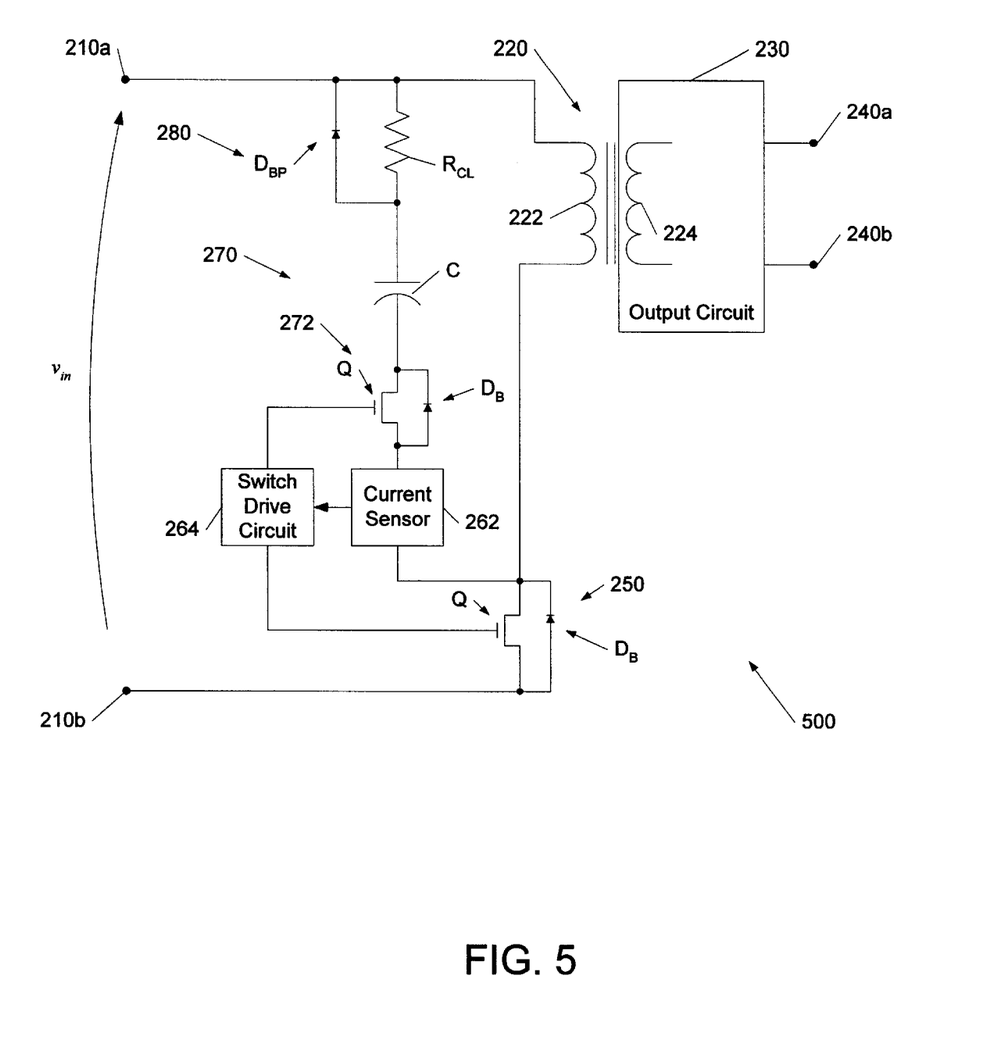
FIG. 5 is a schematic diagram illustrating a clamped converter apparatus with an exemplary current limiting circuit configuration according to some embodiments of the invention.

FIG. 5 illustrates a converter apparatus 500 according to other embodiments of the invention. The converter apparatus 500 is similar to the apparatus 200 of FIG. 2, with like components indicated by like reference numerals, description of which is provided in the foregoing description of FIG. 2. The converter apparatus 500 further includes an asymmetrical current limiting circuit 280 coupled in series with the clamping circuit 270. Here shown as including a current limiting resistor $R_{CL}$ connected in parallel with a bypass diode $D_{BP}$, the asymmetrical current limiting circuit 280 serves to limit current in the switch 272 of the clamping circuit 270 in an asymmetrical fashion. In particular, the current limiting circuit 270 allows relatively large currents to flow from the inductance 222 to the clamping capacitance C through the forward biasing of the bypass diode $D_{BP}$, but limits reverse current through the action of the current limiting resistor $R_{CL}$. This latter characteristic may be particularly advantageous in limiting currents in the switch 272 during transients in which the switch 250 transitions abruptly from a relatively high duty cycle, e.g., near 100% (corresponding to a heavily loaded condition) to a substantially lower duty cycle, with concomitant transitioning of the switch 272 from a relatively low duty cycle, e.g., near 0%, to a substantially higher duty cycle. Although the bypass diode $D_{BP}$ could be omitted, its presence can reduce unnecessary power dissipation in comparison to use of the current limiting resistor $R_{CL}$ alone.

Figure 6:
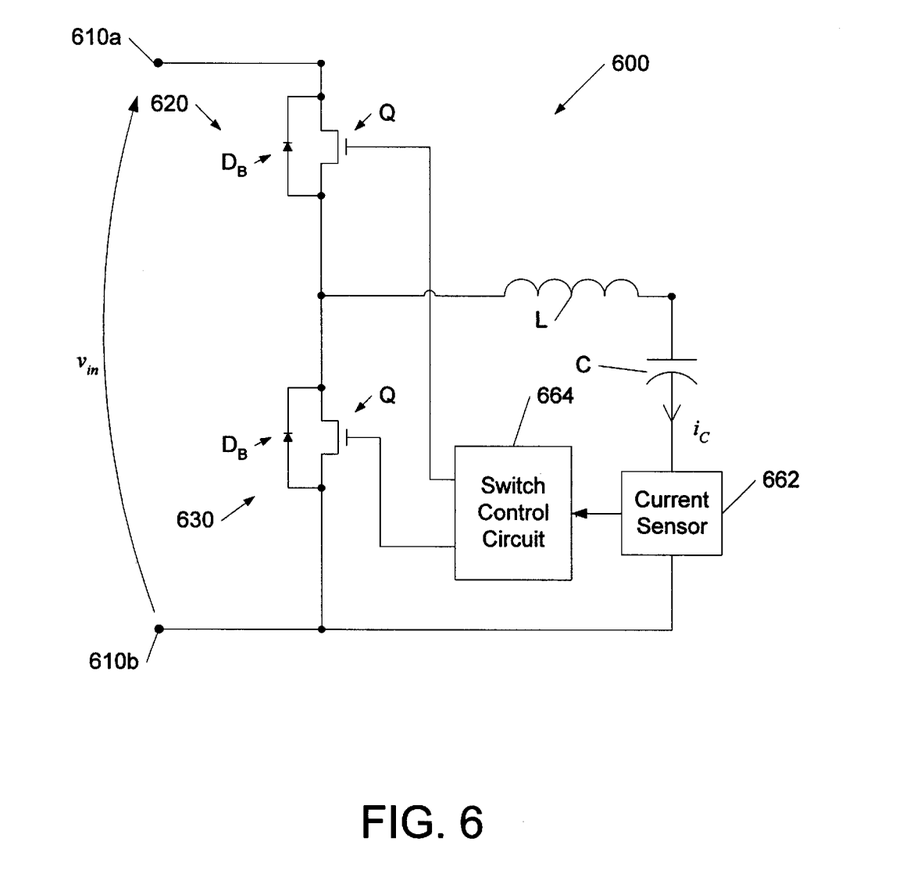
FIG. 6 is a schematic diagram illustrating a power converter apparatus according to still further embodiments of the invention.

As noted above, the invention is not limited to "clamped converter" embodiments, and is generally applicable to many types of converter configurations that cyclically charge a transformer winding, inductor, or other inductance and "clamp" the charged inductance using a resonant, dissipative or other type of clamping circuit. For example, as illustrated in FIG. 6, a converter 600 according to embodiments of the invention may have a structure like that found in an asymmetrical half-bridge converter. As shown, the converter 600 includes a first switch 620 that control current flow between and inductance L and an input port 610a, 610b at which an input voltage $v_{in}$ is applied. As shown, the first switch 620 includes a transistor Q and associated body diode $D_B$. Current flow between the inductance L and a clamping capacitance C is controlled by a second switch 630, here also shown as including a transistor Q and associated body diode $D_B$. The inductance L may be coupled to an output port (not shown for purposes of generality of illustration) in a number of different ways, including, for example, via magnetic coupling (as in a transformer) or electrical coupling to the inductance L.

A switch control circuit 664 controls the first and second switches 620, 630. In particular, the switch control circuit 664 controls the first switch 620 responsive to a current sense signal generated by a current sensor 662 coupled in series with the clamping capacitor C. Much like the embodiments described above with reference to FIGS. 1–5, the switch control circuit 664 operates the switches 620, 630 in a substantially complementary fashion. The switch control circuit 664 is further operative to condition closure of the switch 620 responsive to the current in the inductance L while the capacitor C is still coupled to the inductance L. In this manner, peak current in the inductance L can be limited, and reverse recovery of the body diode DB of the switch 630 can be controlled.

Figure 7:
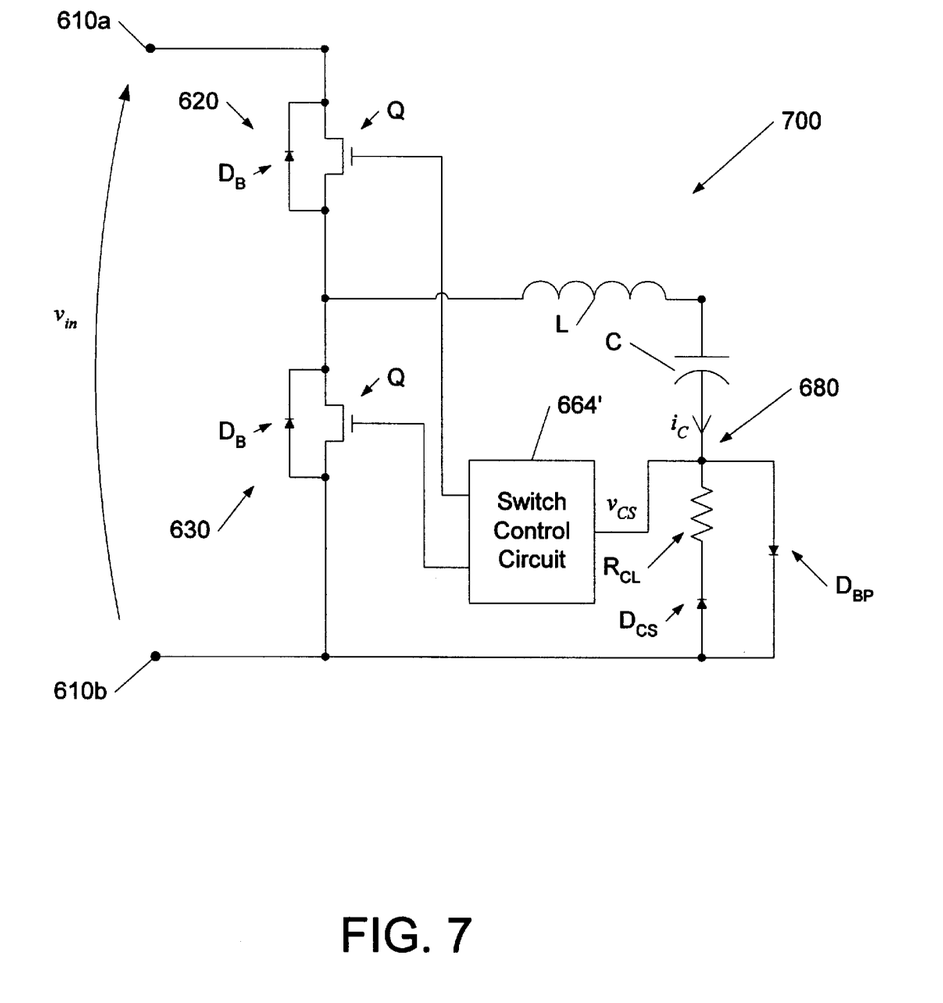
FIG. 7 is a schematic diagram illustrating a power converter apparatus with an exemplary current limit/current sense circuit according to some embodiments of the invention.

FIG. 7 illustrates a converter apparatus 700 according to other embodiments of the invention. The apparatus 700 is similar to the apparatus 600, with like components illustrated by like reference numerals, description of which is provided in the foregoing description of FIG. 6. The apparatus 700 includes a combined current limiting/current sensing circuit including a current limiting resistor $R_{CL}$, a bypass diode $D_{BP}$, and a current sense diode $D_{CS}$ coupled in series with the current limiting resistor $R_{CL}$. A voltage $v_{CS}$ at a node 680 at which the current limiting resistor $R_{CL}$ is coupled to the clamping capacitor C serves as a current sense signal provided to a switch control circuit 664' that controls the first and second switches 620, 630. Along the lines of the switch control circuit 664 of FIG. 6, the switch control circuit 664' is operative to condition closure of the switch 620 responsive to the current sense signal $v_{CS}$, which is representative of the current in the inductance L while the capacitor C is coupled to the inductance L.

In particular, assuming the voltage at the second terminal 610b of the input port is signal ground (zero volts), when the current $i_C$ in the clamping capacitor C is positive (in the sense defined by the arrow), the voltage $v_{CS}$ is approximately one diode drop (e.g., 0.6 volts) positive due to the forward biasing of the bypass diode $D_{BP}$. However, when the current ic approaches zero and passes to a negative value, the bypass diode becomes reversed biased, and the current sense diode $D_{CS}$ becomes forward biased. This causes the current sense voltage $v_{CS}$ to transition to at least one diode drop negative (e.g., −0.6 volts or lower). This change in voltage can be detected by the switch control circuit 664', which may responsively enable closure of the first switch 620. For example, the switch control circuit 664' may include, for example, comparator and/or other signal detection circuitry that detects such a transition of the current sense voltage $v_{CS}$. In this manner, saturation of the inductance L and/or reverse recovery of the body diode $D_B$ of the switch 630 can be controlled.

Figure 8:
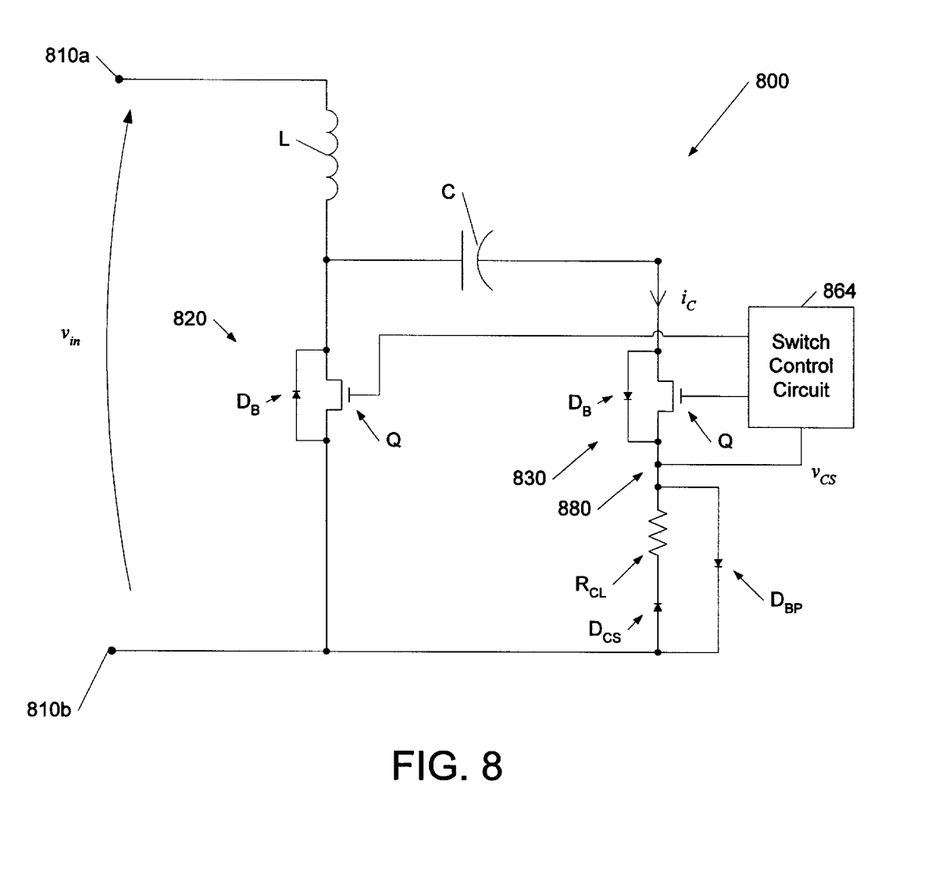
FIG. 8 is a schematic diagram illustrating still another power converter configuration according to embodiments of the invention.

FIG. 8 illustrates yet another possible converter topology according to embodiments of the invention. The converter apparatus includes an inductance L and a clamping capacitance C. As with the converter apparatus of FIGS. 6 and 7, the inductance L may be coupled to an output port (not shown for purposes of generality of illustration) in a number of different ways, including magnetic and electrical coupling. A first switch 820, including a transistor Q and associated body diode $D_B$, is operative to control current flow between the inductance L and an input port 810a, 810b at which an input voltage $v_{in}$ is applied. A second switch 830, also including a transistor Q and body diode $D_B$, is operative to control current flow between the clamping capacitor C and the inductance L. A switch control circuit 864 operates the first and second switches 820, 830 in a substantially complementary fashion, and is further operative to condition operation of the switch 820 on a current sense signal $v_{CS}$ generated at a node 880 at which the second switch 830 is connected to a current limit/current sense circuit including a current limiting resistor $R_{CL}$, a bypass diode $D_{BP}$, and a current sense diode $D_{CS}$. The current limit/current sense circuit can operate in a manner similar to that described with reference to FIG. 7.

Figure 9:
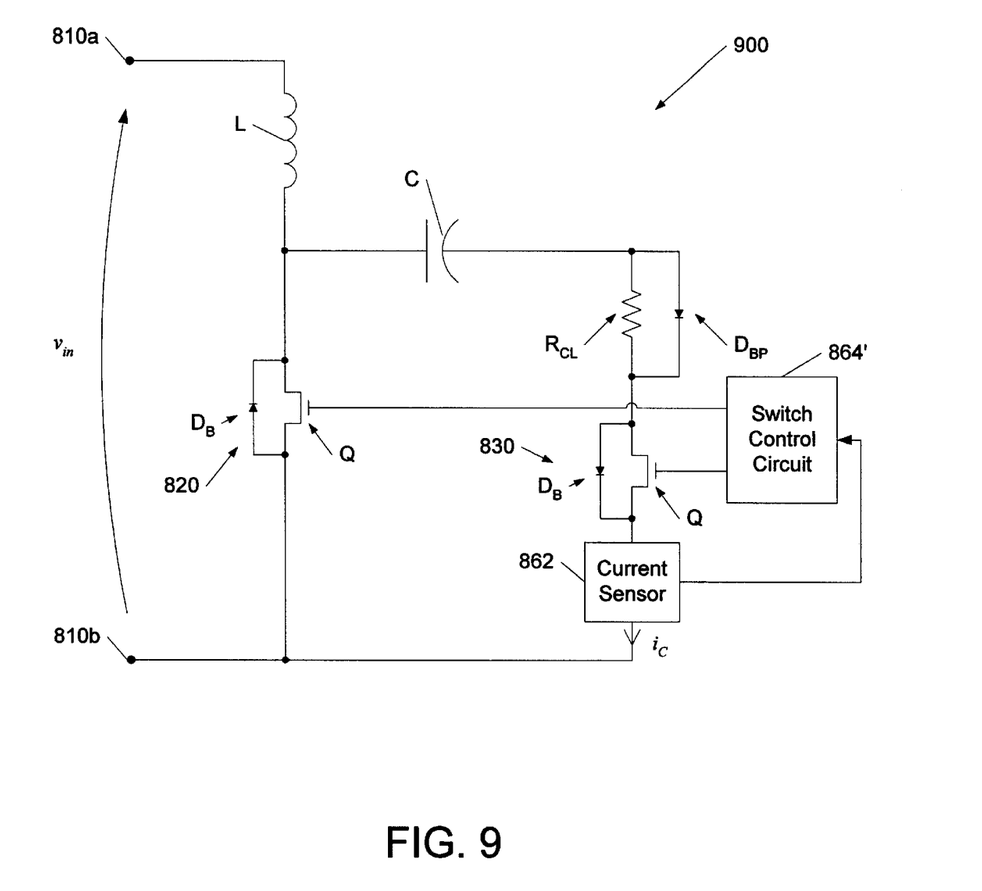
FIG. 9 is a schematic diagram illustrating a power converter apparatus with an exemplary current limit circuit according to still further embodiments of the invention.

FIG. 9 illustrates a converter apparatus 900 according to yet other embodiments of the invention. The apparatus 900 is similar to the apparatus 800 of FIG. 8, with like elements indicated by like reference numerals, description of which is provided above with reference to FIG. 8. The apparatus 900 differs from the apparatus 800 in that the current limiting resistor $R_{CL}$ and bypass diode $D_{BP}$ are moved to the other side of the transistor switch 830. This allows the switch 830 to operate in a linear, current limiting manner when current $i_C$ in the clamping capacitance C becomes excessive in the negative direction. A current sensor 862 coupled in series with the switch 830 provides a current sense signal to a switch control circuit 864' that controls the first and second switches 820, 830.

In the drawings and foregoing description thereof, there have been disclosed typical embodiments of the invention. Terms employed in the description are used in a generic and descriptive sense and not for purposes of limitation, the scope of the invention being set forth in the following claims.

That which is claimed is:

1. A power converter apparatus, comprising:
   an input port;
   an output port;
   an inductance;
   a clamping circuit coupled to the inductance;
   a switch operative to control energy transfer between the input port and the inductance;
   a control circuit operative to control the switch responsive to a current in the inductance while current is being transferred between the inductance and the clamping circuit; and
   an output circuit coupled to the inductance and the output port.

2. A power converter apparatus according to claim 1, wherein the control circuit comprises:
   a current sensor configured to be coupled in series with the inductance while current is being transferred between the inductance and the clamping circuit and operative to generate a current sense signal indicative of the current in the inductance; and
   a switch control circuit operative to control the switch responsive to the current sense signal.

3. A power converter apparatus according to claim 2, wherein the switch control circuit is operative to transition the switch from a first state that impedes current flow between the input port and the inductance and a second state that supports current flow between the input port and the inductance responsive to the current sense signal meeting a predetermined criterion.

4. A power converter apparatus according to claim 2:
   wherein the switch comprises a first switch;
   wherein the clamping circuit comprises:
      an impedance;
      a second switch operative to control current flow between the impedance and the inductance; and
      a clamping control circuit operative to control the second switch.

5. A power converter apparatus according to claim 4:
   wherein the second switch comprises:
      a transistor responsive to a control signal; and
      a diode coupled in parallel with the transistor; and
   wherein the clamping control circuit is operative to generate the clamping control signal.

6. A power converter apparatus according to claim 4, wherein the impedance comprises a capacitor.

7. A power converter apparatus according to claim 4, further comprising a current limiting circuit operative to limit current in the second switch.

8. A power converter apparatus according to claim 7, wherein the current limiting circuit comprises a resistor coupled in series with the second switch.

9. A power converter apparatus according to claim 8, wherein the current sensor comprises a diode coupled in series with the resistor.

10. A power converter apparatus according to claim 7, wherein the current limiting circuit comprises a parallel combination of a resistor and a diode coupled in series with the second switch.

11. A power converter apparatus according to claim 7, wherein the current limiting circuit provides a variable impedance responsive to the direction of the current between the impedance and the inductance.

12. A power converter apparatus according to claim 4:
   wherein the second switch comprises a parallel combination of a transistor and a diode;
   wherein the clamping control circuit is operative to control the transistor; and
   wherein the switch control circuit and the clamping control circuit are operative to control the first switch and the transistor such that the first switch transitions to the second state and the impedance is decoupled from the inductance responsive to the current sense signal indicating a reversal of current in the transistor.

13. A power converter apparatus according to claim 1, wherein the inductance comprises at least one of a winding of a transformer and an inductor.

14. A power converter apparatus according to claim 1, wherein the first switch comprises a transistor.

15. A power converter apparatus, comprising:
an input port;
an output port;
an inductance;
an impedance;
a first switch operative to control current flow between the input port and the inductance;
a second switch operative to control current flow between the impedance and the inductance;
a control circuit that operates the first and second switches in a substantially complementary fashion to provide energy transfer between the inductance and respective ones of the input port and the impedance, the control circuit further operative to control operation of the first switch responsive to a current in the inductance; and
an output circuit coupled to the inductance and the output port.

16. A power converter apparatus according to claim 15, wherein the control circuit is operative, while current is being transferred between the inductance and the impedance, to control the first switch responsive to a current in the inductance.

17. A power converter apparatus according to claim 16, wherein the control circuit is operative to the first switch from a first state in which the first switch impedes current flow between the input port and the inductance to second state in which the first switch supports current flow between the input port and the inductance responsive to the current in the inductance meeting a predetermined criterion.

18. A power converter apparatus according to claim 15, wherein the control circuit comprises:
a current sensor configured to be coupled in series with the inductance while current is being transferred between the inductance and the impedance and operative to generate a current sense signal indicative of the current in the inductance; and
a switch control circuit operative to control the first switch responsive to the current sense signal.

19. A power converter apparatus according to claim 15, further comprising a current limiting circuit operative to limit current in the second switch.

20. A power converter apparatus according to claim 19, wherein the current limiting circuit provides a variable impedance responsive to the direction of the current between the capacitance and the inductance.

21. A power converter apparatus according to claim 15, wherein the inductance comprises at least one of a winding of a transformer and an inductor.

22. A power converter apparatus according to claim 15, wherein the impedance comprises a capacitance.

23. A power converter apparatus, comprising:
an input port;
an output port;
an inductance;
a capacitance;
a first switch operative to control current flow between the input port and the inductance;
a second switch operative to control current flow between the capacitance and the inductance;
a switch control circuit that operates the first and second switches in a substantially complementary fashion to provide energy transfer between the inductance and respective ones of the input port and the capacitance;
a current limiting circuit coupled in series with the capacitance and the second switch; and
an output circuit coupled to the inductance and the output port.

24. A power converter apparatus according to claim 23, wherein the current limiting circuit comprises a resistor coupled in series with the capacitance and the second switch.

25. A power converter apparatus according to claim 23, wherein the current limiting circuit provides a variable impedance responsive to the direction of the current between the capacitance and the inductance.

26. A power converter apparatus according to claim 25, wherein the current limiting circuit comprises a parallel combination of a resistor and a diode coupled in series with the second switch and the capacitance.

27. A power converter apparatus, comprising:
an input port;
an output port;
an inductance;
means for clamping the inductance;
means for sensing a current in the inductance while the inductance is clamped;
means for controlling current flow between the input port and the inductance responsive to the sensed current; and
means, coupled to the inductance and the output port, for transferring power to the output port.

28. A power converter apparatus according to claim 27:
wherein the means for sensing a current in the inductance while the inductance is clamped comprises means for generating a current sense signal representing the current in the inductance while the inductance is clamped; and
wherein the means for controlling current flow between the input port and the inductance responsive to the sensed current comprises means for coupling and decoupling the input port to and from the inductance responsive to the current sense signal.

29. A method of operating a power converter apparatus that transfers energy from a power source to a load by cyclically energizing an inductance, the method comprising:
decoupling the power source from the inductance;
clamping the inductance while sensing a current therein; and
coupling the power source to the inductance responsive to the sensed current.

30. A method according to claim 29, wherein clamping the inductance while sensing a current therein comprises generating a current sense signal representing the current in the inductance, and wherein coupling the power source to the inductance responsive to the sensed current comprises coupling the power source to the inductance responsive to the current sense signal.

31. A method according to claim 30, wherein generating a current sense signal comprises:
providing a current sensor in series with the inductance; and generating the current sense signal from the current sensor.

32. A method according to claim 29:

wherein decoupling a power source from an inductance comprises opening a first switch to decouple the power source from the inductance;

wherein clamping the inductance comprises closing a second switch to enable current transfer between an impedance and the inductance; and wherein coupling the power source to the inductance responsive to the sensed current comprises closing the first switch responsive to the sensed current.

33. A method according to claim 32, wherein the first switch comprises a first transistor, and wherein the second switch comprises a parallel combination of a second transistor and a diode, and wherein clamping the inductance comprises opening the first switch to forward bias the diode.

34. A method according to claim 32, further comprising limiting current through the second switch.

35. A method according to claim 34, wherein limiting current through the second switch comprises varying an impedance in series with the switch responsive to direction of current through the switch.

36. A method according to claim 32, wherein the impedance comprises a capacitance.

37. A method according to claim 36, wherein the inductance comprises at least one of a winding of a transformer and an inductor.

* * * * *